(No Model.)
J. FREW.
PYROMETER.
No. 339,756. Patented Apr. 13, 1886.
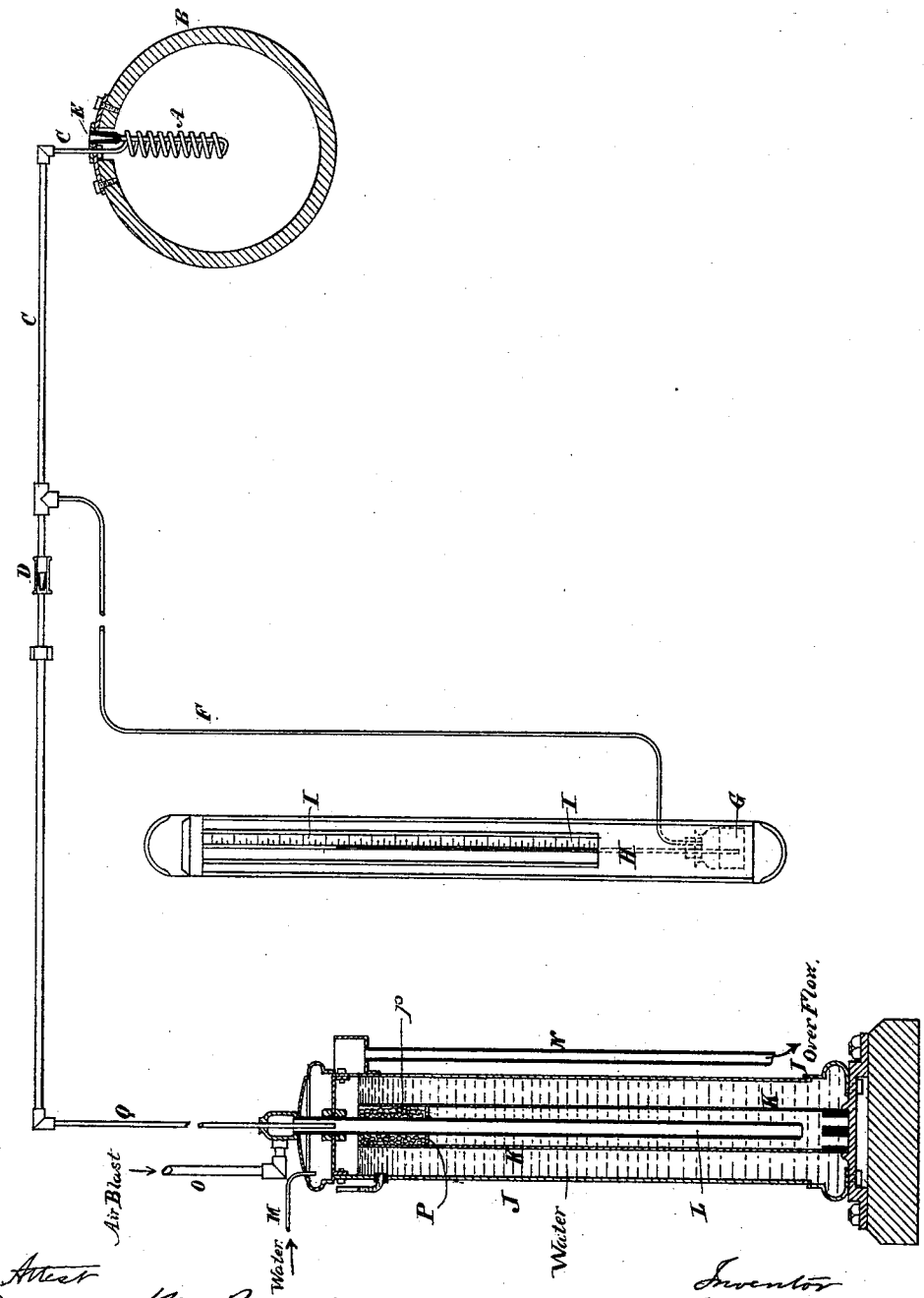

UNITED STATES PATENT OFFICE.

JOHN FREW, OF LANGLOAN, NEAR COATBRIDGE, COUNTY OF LANARK, SCOTLAND.

PYROMETER.

SPECIFICATION forming part of Letters Patent No. 339,756, dated April 13, 1886.

Application filed December 19, 1885. Serial No. 186,216. (No model.) Patented in England February 25, 1885, No. 2,568.

*To all whom it may concern:*

Be it known that I, JOHN FREW, a citizen of the United Kingdom of Great Britain and Ireland, residing at Langloan, near Coatbridge, in the county of Lanark, Scotland, have invented new and useful Improvements in and Connected with Pyrometers; and I do hereby declare that the following is a full, clear, and exact description of the invention, which will enable others skilled in the manufacture or art to which it relates to make and use the same.

The object of my invention is to provide a simple and reliable pyrometer for indicating temperatures over an extensive range and with great accuracy. To that end I employ an improved device wherein the volume of air or other aeriform fluid passing through a tube or hollow vessel is expanded by the heat of the object or substance whose temperature is to be ascertained, and is caused to act upon a liquid column or other indicator provided with a graduated scale.

The accompanying diagram illustrates a form of my improved pyrometer which is adapted for indicating the temperature of the hot blast employed in blast-furnaces and of the hot gases issuing from such furnaces. It consists of a tubular vessel, A, which, in order to provide considerable surface within small compass, is made of helical form. This vessel is placed within the hot-blast pipe or gas-pipe B, or in the chamber whose temperature is to be ascertained, and it may be suitably protected from the direct action of the hot air or gas by a casing or cover.

To the vessel A is connected an inlet-tube, C, in which is fitted a small nozzle, D, to regulate the inflow of cold air, and a nozzle, E, of the same or very slightly larger diameter than the nozzle D, is provided in the outlet end of the helical tube. The relative diameters of bore of the inlet and outlet nozzles should be such that the cold air, which is supplied in the form of a blast at approximately uniform pressure, may freely pass through the outlet so long as it is not heated in its passage through the helical tube A, but that as the air expands by the communication to it of external heat it is unable to pass through the outlet-nozzle as rapidly as it flows in by the inlet-nozzle, and an increase of pressure of the air within the tube results.

At any convenient point between the inlet and outlet nozzles a pipe, F, is connected and led into a small covered vessel, G, containing a colored liquid, and having fitted therein a vertical glass tube, H, dipping into the colored liquid. The increased pressure of the air within the helical tube A, due to expansion by the heat communicated thereto from the hot blast or furnace gases within the pipe B, as above mentioned, is communicated to the vessel G, whereby the colored liquid is forced up the glass tube H to an extent which will vary with the pressure of the air within the tube A, and therefore with the temperature of the hot blast or gas within the pipe B. The colored liquid may be a mixture not readily vaporized by heat. A graduated scale, I, is provided to indicate the extent of movement of the fluid in the tube H, so that correct readings of the temperature of the hot blast or gas may be taken at any time. The scale is constructed by experimentally ascertaining the position of the indicating-fluid at known temperatures of hot air, water, or other substance in which the tube A is or may be immersed.

A spring and pointer or Bourdon gage or similar pressure-indicator may be substituted for the fluid-indicator above described.

To insure uniformity of pressure of the cold blast of air passing into the helical tube A, a pressure-reducing valve or similar device may be employed; but I prefer to use the apparatus shown in the drawing, which consists of a water-cistern, J, provided with a central tube, K, in which dips a pipe, L. The cistern is filled by the pipe M, and an overflow, N, is provided, the level of the water being uniformly maintained at the height of the overflow. The cold blast is admitted by a pipe, O, to the tube L, and uniform pressure equal to that corresponding to a column of water of the length of the dip-pipe L below the water-level is maintained by the escape of any excess of air through the lower open end of the pipe L. A perforated plate, P, with a covering of loose material—such as leaden balls *p*—prevents agitation and disturbance of the water-level by the upward flow of the air escaping at the lower end of the pipe L into the central tube, K. From the upper end of the dip-pipe L the cold blast passes by a tube, Q, to the inlet-tube C of the pyrometer.

Having now described the invention, what I desire to claim and secure by Letters Patent is—

1. The combination, with an expansion-chamber containing an aeriform fluid and a tube containing an indicator, of a tube containing an aeriform fluid and connecting said expansion-chamber and indicator-tube, for the purpose set forth.

2. In a pyrometer, the combination, with an expansion tube or chamber having an outlet-nozzle and an inlet-tube, and a fluid forced therethrough, of a tube containing an indicator and a tube connecting said indicator-tube with the inlet-tube, substantially as set forth.

3. The combination of the spiral tube or expansion-vessel A, provided with inlet and outlet nozzles D E, the air-supply pipe C, and pressure-regulating apparatus J K L, branch pipe F, liquid-vessel G, and pipe H, provided with a graduated scale, substantially as and for the purpose set forth.

4. In a pyrometer, the combination, with an expansion tube or chamber having an outlet-nozzle and an inlet-tube, an indicator, and a tube connecting said inlet-tube and indicator, of an aeriform fluid forced through said inlet-tube, and a regulator for equalizing the pressure of said fluid, as set forth.

In witness whereof I have hereunto set my hand this 3d day of December, 1885.

JOHN FREW.

Witnesses:
HUGH FITZPATRICK,
T. R. ANDERSON,
*Both of 135 Buchanan St., Glasgow.*